US011492005B1

(12) United States Patent
Bond

(10) Patent No.: US 11,492,005 B1
(45) Date of Patent: Nov. 8, 2022

(54) SYSTEMS AND METHODS FOR COMMUNICATING WITH VISION AND HEARING IMPAIRED VEHICLE OCCUPANTS

(71) Applicant: GM GLOBAL TECHNOLOGY OPERATIONS LLC, Detroit, MI (US)

(72) Inventor: Jacob Alan Bond, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/410,189

(22) Filed: Aug. 24, 2021

(51) Int. Cl.
| | |
|---|---|
| *H04N 5/44* | (2011.01) |
| *B60W 50/14* | (2020.01) |
| *B60W 40/08* | (2012.01) |
| *G10L 21/10* | (2013.01) |
| *B60W 40/02* | (2006.01) |
| *G10L 21/06* | (2013.01) |

(52) U.S. Cl.
CPC ............ *B60W 50/14* (2013.01); *B60W 40/02* (2013.01); *B60W 40/08* (2013.01); *G10L 21/10* (2013.01); *B60W 2050/143* (2013.01); *B60W 2050/146* (2013.01); *B60W 2540/221* (2020.02); *B60W 2540/227* (2020.02); *B60W 2554/4049* (2020.02); *G10L 2021/065* (2013.01)

(58) Field of Classification Search
CPC ...... B60W 50/14; B60W 40/02; B60W 40/08; B60W 2050/143; B60W 2050/146; B60W 2540/221; B60W 2540/227; B60W 2554/4049; G10L 21/10; G10L 2021/065
See application file for complete search history.

(56) References Cited

U.S. PATENT DOCUMENTS

| | | | |
|---|---|---|---|
| 11,370,391 B1* | 6/2022 | Gammelgard | ...... B60R 25/1004 |
| 2014/0309806 A1* | 10/2014 | Ricci | ...... G06Q 10/20 701/1 |
| 2014/0310594 A1* | 10/2014 | Ricci | ...... G06F 3/0622 715/702 |
| 2014/0310610 A1* | 10/2014 | Ricci | ...... B60C 1/00 715/744 |
| 2016/0358453 A1* | 12/2016 | Wassef | ...... B60R 16/02 |

FOREIGN PATENT DOCUMENTS

KR 20210068761 A * 6/2021

* cited by examiner

*Primary Examiner* — Munear T Akki
(74) *Attorney, Agent, or Firm* — Lorenz & Kopf, LLP

(57) ABSTRACT

Methods and systems for controlling an occupant output system associated with a vehicle are provided. The methods and systems receive vehicle or occupant context data from a source of vehicle context data, generate occupant message data based on the vehicle or occupant context data and determine if an occupant associated with the occupant output system is vision or hearing impaired. When the occupant is determined to be vision or hearing impaired, the methods and systems decide on an output modality to assist the occupant, and generate an output for the occupant on the output device, and in the output modality, based on the occupant message data.

19 Claims, 5 Drawing Sheets

SYSTEMS AND METHODS FOR COMMUNICATING WITH VISION AND HEARING IMPAIRED VEHICLE OCCUPANTS

TECHNICAL FIELD

The present disclosure generally relates to systems and methods associated with vehicles, and more particularly relates to systems and methods for communicating with hearing and vision impaired occupants of a vehicle.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems (ADAS), such as cruise control, adaptive cruise control, and parking assistance systems correspond to lower automation levels, while true "driverless" vehicles correspond to higher automation levels.

Vision impaired vehicle passengers may find some vehicle actions (e.g. a sudden swerve) unsettling and may not have full knowledge of the outside scene, which can also be unsettling. Further, embarking and disembarking a vehicle (such as a shared ride vehicle) can be difficult for vision impaired passengers. Hearing impaired vehicle occupants may not gain the full range of information being communicated by the vehicle such as upcoming stops or map guidance directions, as two of many possible examples.

Accordingly, it is desirable to provide systems and methods that assist hearing and vision impaired vehicle occupants receiving communications from the vehicle. Additionally, it is desirable to provide a variety of information to vision and hearing impaired occupants to assist in the comfort and safety of those passengers. Furthermore, other desirable features and characteristics of the present invention will become apparent from the subsequent detailed description and the appended claims, taken in conjunction with the accompanying drawings and the foregoing technical field and background.

SUMMARY

A system associated with a vehicle. The system includes an occupant output system including an output device, a source of vehicle context data, and a processor in operable communication with the occupant output system and the source of vehicle context data. The processor is configured to execute program instructions to cause the processor to receive vehicle or occupant context data from the source of vehicle context data, generate occupant message data based on the vehicle or occupant context data, determine if an occupant associated with the occupant output system is vision or hearing impaired, when the occupant is determined to be vision or hearing impaired, decide on an output modality to assist the occupant, and generate an output for the occupant on the output device, and in the output modality, based on the occupant message data.

In embodiments, the vehicle or occupant context data includes image or other perception data from an external scene of the vehicle.

In embodiments, the vehicle or occupant context data includes a location of the occupant relative to the vehicle.

In embodiments, the program instructions are configured to cause the processor to determine the location of the occupant relative to the vehicle based on one or more transmission signals from an occupant device.

In embodiments, the vehicle or occupant context data includes vehicle behavior information based on vehicle control commands.

In embodiments, the vehicle or occupant context data includes map data.

In embodiments, the occupant message data includes a message describing an environment external to the vehicle.

In embodiments, the occupant message data includes guidance for the occupant for embarking or disembarking the vehicle or any other occupant actions associated with the vehicle.

In embodiments, the occupant message data includes a description of actions taken by the vehicle.

In embodiments, determining whether the occupant is vision or hearing impaired is based on stored occupant data.

In embodiments, determining whether the occupant is vision or hearing impaired includes retrieving the stored occupant data based on an occupant identifier.

In embodiments, the occupant identifier is determined based on biometric identification of the occupant or based on a communication from an occupant device.

In embodiments, determining whether the occupant is vision or hearing impaired is performed by automatic detection.

In embodiments, generating the output for the occupant includes translating a message included in the message data into a preferred language of the occupant.

In embodiments, generating the output for the occupant includes generating sign language animation and/or text output and displaying the sign language animation on a visual display device of the output device when the occupant is determined to be hearing impaired.

In embodiments, generating the output for the occupant includes generating an audio output on an audio output device of the occupant output system.

In embodiments, the vehicle or occupant context data includes occupant location relative to the vehicle and an occupant identifier, the occupant location and the occupant identifier is determined based on wireless communications from an occupant device, the occupant message data includes guidance on approaching, entering, exiting, or departing the vehicle, which is determined based on the occupant location, and determining if an occupant associated with the occupant output system is vision or hearing impaired is based on the occupant identifier.

In embodiments, the vehicle or occupant context data is generated by the processor by fusing environmental data from a perception system and vehicle action data derived from vehicle control commands generated by an autonomous driving system of the vehicle.

In another aspect, a method is provided for controlling an occupant output system associated with a vehicle. The method includes receiving, via a processor, vehicle or occupant context data from source of vehicle context data; generating, via the processor, occupant message data based on the vehicle or occupant context data, determining, via the processor, if an occupant associated with the occupant output system is vision or hearing impaired, when the occupant is determined to be vision or hearing impaired, deciding, via the processor, on an output modality to assist the occupant, and generating, via the processor, an output for the occupant on output device of the occupant output system, and in the output modality, based on the occupant message data.

In embodiments, the method includes generating sign language animations and/or text output as the output for the occupant when the occupant is determined to be hearing impaired.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "occupant" or "passenger" includes persons located in the vehicle (e.g. on a seat of the vehicle) and also persons intending to, or about to, board the vehicle.

Figure 1:
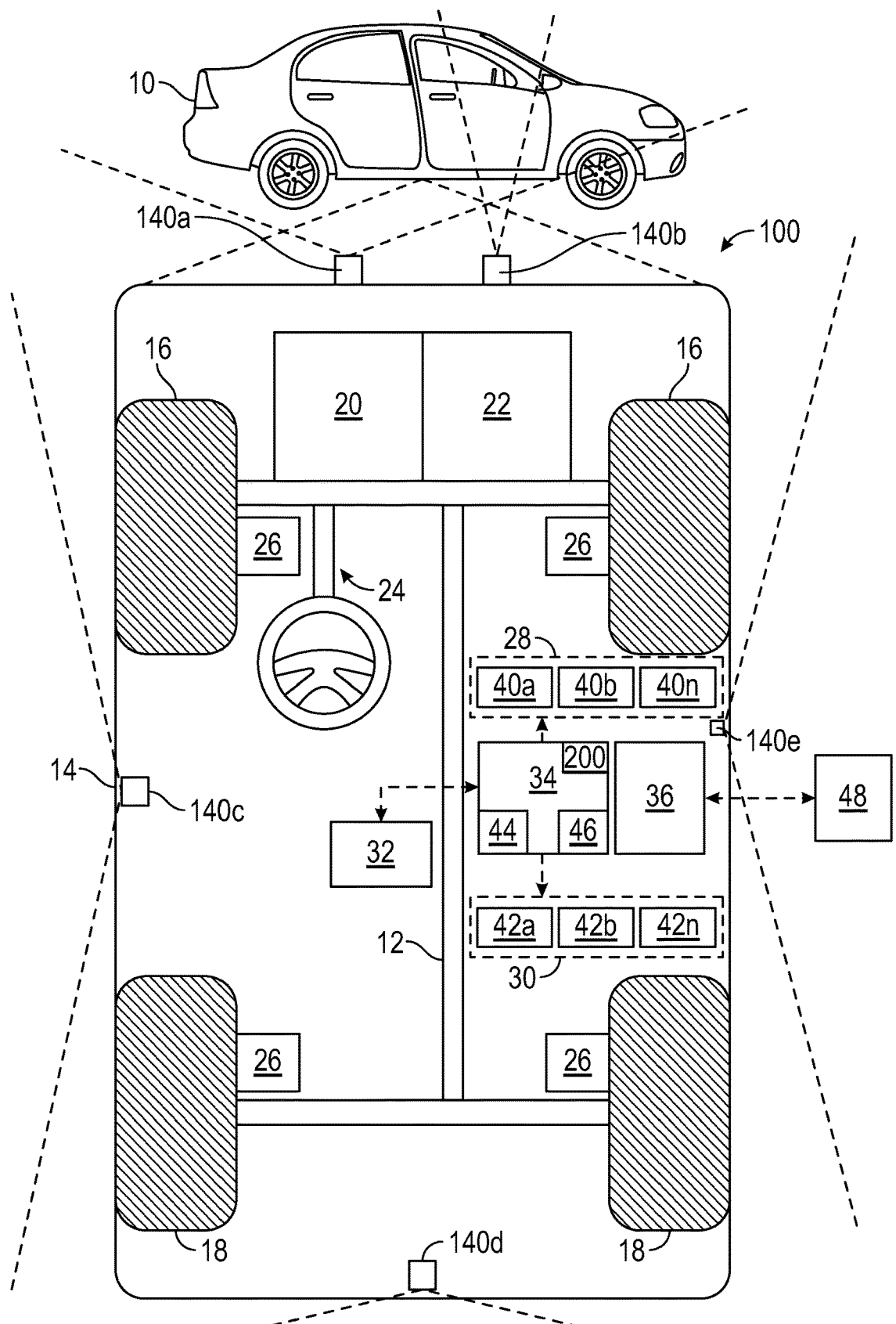
FIG. 1 is a functional block diagram illustrating a vehicle associated with a communication system for communicating with blind and vision impaired occupants, in accordance with various embodiments.

With reference to FIG. 1, a communication system shown generally at 200 is associated with a vehicle 10 in accordance with various embodiments. In general, the communication system 200 provides information to a vision or hearing impaired occupant of the vehicle. The information can include assistance for a vision-impaired individual to enter the vehicle. The communication system 200 may use a personal application which can communicate with the vehicle 10 and provide guidance, including precise real-time movement guidance, to vision and hearing-impaired individuals in a preferred output modality of the vision or hearing impaired person. The information communicated by the communication system 200 can include information on actions taken by the vehicle, and other contextual information, to hearing or vision impaired occupants. The communicated information can be determined by fusing environment data and vehicle control data. The communication system 200 can generate the output using neural machine translation to a preferred language of the occupant. The output can include sign language animation generation (and/or text output) for hearing impaired occupants and audio information for vision impaired occupants. The communication system 200 may automatically detect if an occupant is vision impaired or hearing impaired by monitoring eye movements and reaction to sounds. In the embodiment of FIG. 1, the communication system 200 is shown as included within the vehicle 10 but a distributed system can be provided with some parts included in an occupant's personal electronic device (e.g. a smartphone or tablet), some parts located in a cloud processing system and some parts located on-board the vehicle 10 or any combination thereof.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the communication system 200 is associate with the vehicle 10 (hereinafter referred to as the vehicle 10). The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, shared passenger vehicles, coaches, etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. However, in other embodiments, the vehicle 10 is of a lower level of automation and includes advanced driver assistance systems (ADAS).

As shown, the vehicle 10 generally includes a propulsion system 20, a transmission system 22, a steering system 24, a brake system 26, a sensor system 28, an actuator system 30, at least one data storage device 32, at least one controller 34, and a connected system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The connected system 36 is configured to wirelessly communicate information to and from other entities 48, such as but not limited to, other vehicles ("V2V" communication,) infrastructure ("V2I" communication), remote systems, and/or personal devices. In an exemplary embodiment, the connected system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the vehicle 10. In various embodiments, the data storage device 32 stores defined maps of the navigable environment. In various embodiments, the defined maps may be predefined by and obtained from a remote system (e.g. a cloud processing system). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 3:
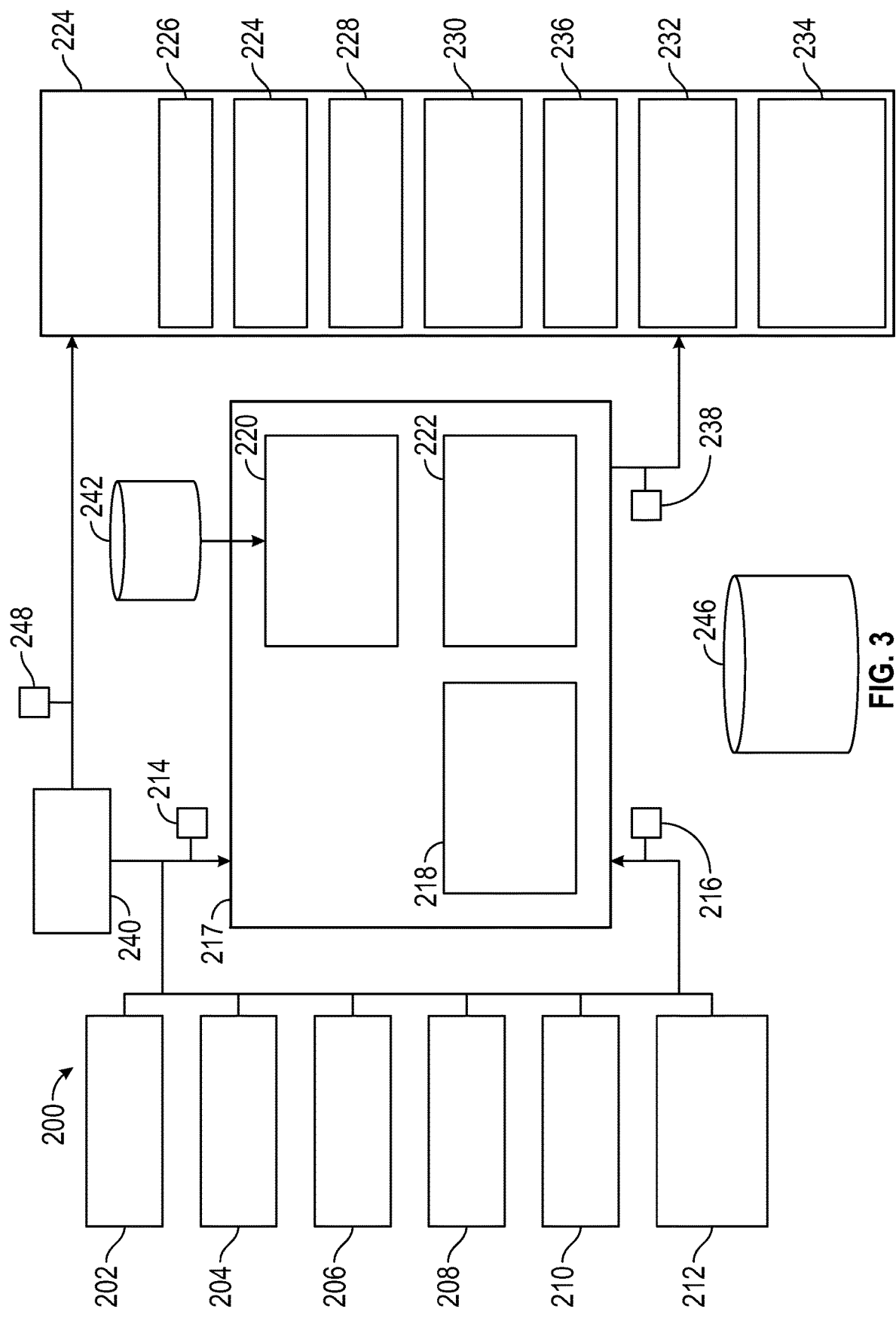
FIG. 3 is a functional block diagram of the communication system, in accordance with various embodiments.
Figure 4:
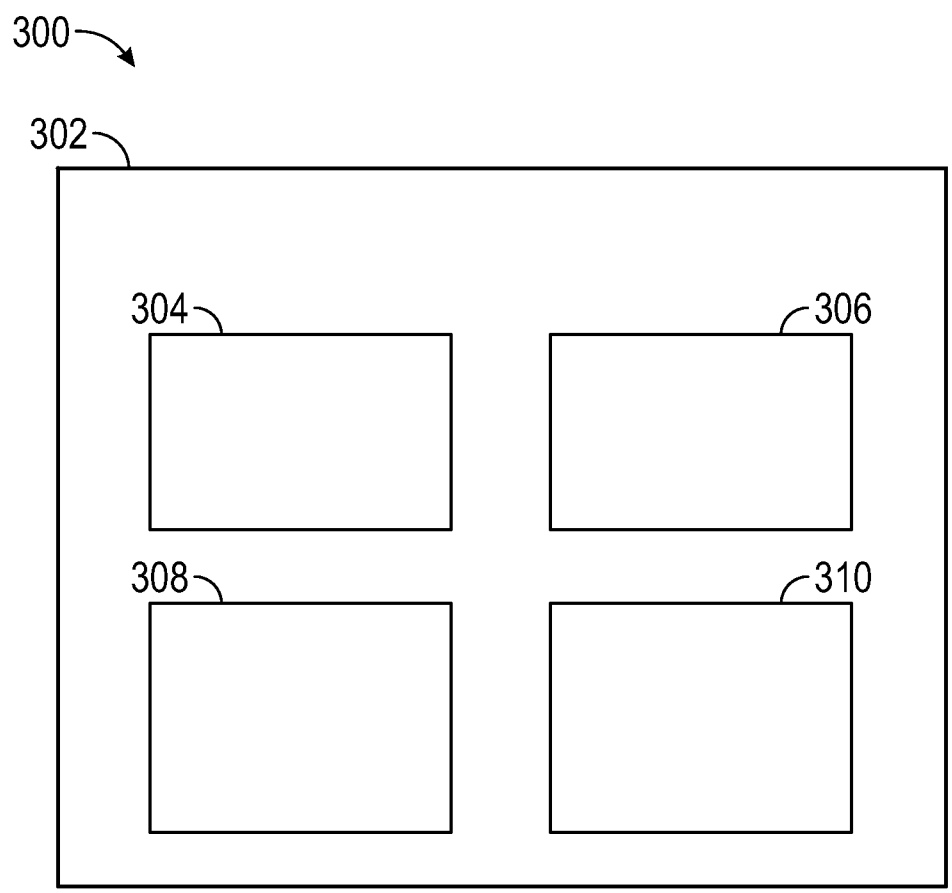
FIG. 4 is a functional block diagram a detection system for automatically detecting a vision or hearing impaired person that can be associated with the communication system, in accordance with various embodiments.
Figure 5:
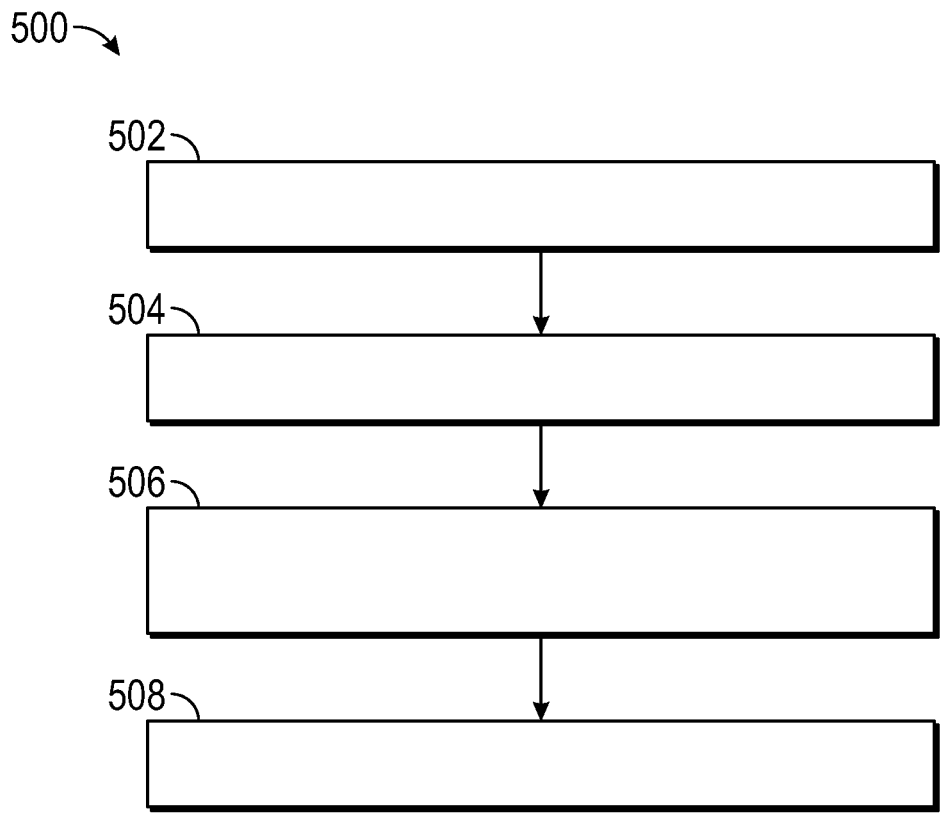
FIG. 5 is a flowchart illustrating a method of communication with vision and hearing impaired occupants of a vehicle, in accordance with various embodiments.
Figure 6:
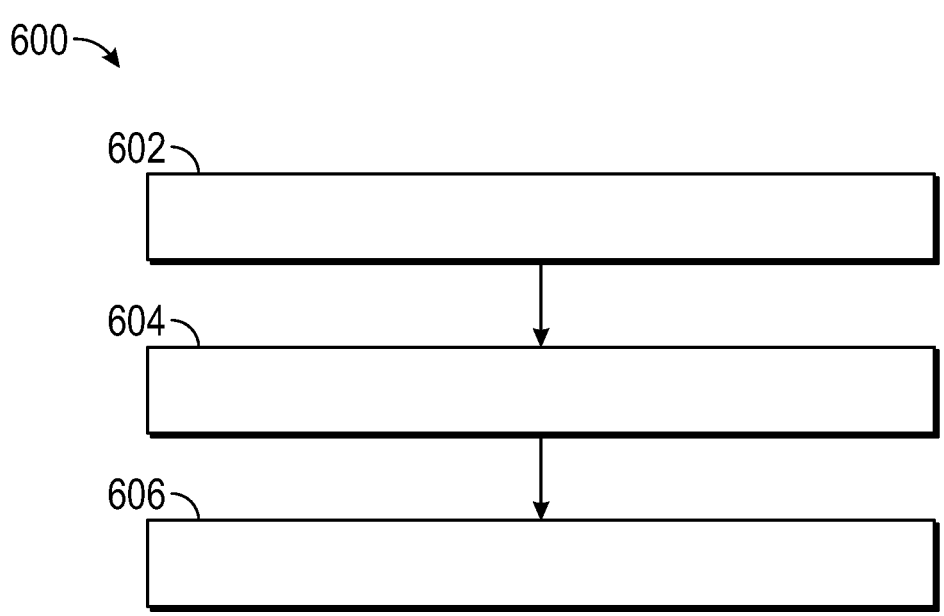
FIG. 6 is a flowchart illustrating a method of automatically detecting a vision or hearing impaired person.

In various embodiments, one or more instructions of the controller 34 are embodied in the communication system 200 and, when executed by the processor 44, perform the functions described with respect to systems of FIGS. 3 and 4 and the steps of the methods described with respect to FIGS. 5 and 6. In particular, the processor 44 is configured by the instructions to allow a personal application to communicate with the vehicle 10 and translate pertinent information into a communication modality desired by an individual including sign language animations. Wireless connectivity technology allows the communication system to provide precise position information during entering and exiting from the vehicle 10. Further, the processor 44 is configured by the instructions to explain environment and vehicle contextual information to the occupant and output the explanation in a modality suited for the hearing and vision impaired passenger. The explanations may be provided for ADAS equipped vehicles or for vehicles with higher levels of automation. Yet further, the processor 44 is configured by the instructions to automatically determine when a vision or hearing impaired communication modality is needed without having previously interacted with an individual.

The vehicle 10 described with regard to FIG. 1 may be suitable for use in the context of a taxi, bus or shuttle system in a certain geographical area (e.g., a city, a school or business campus, a shopping center, an amusement park, an event center, or the like) or may simply be managed by a remote system. For example, the vehicle 10 may be associated with an autonomous vehicle based remote transportation system. In various embodiments, the operating environment further includes one or more user devices (not shown) that communicate with the vehicle 10 and/or the remote transportation system (not shown) via a communication network (not shown). A registered user of the remote transportation system can create a ride request via the user device. The ride request will typically indicate the passenger's desired pickup location (or current GPS location), the desired destination location (which may identify a predefined vehicle stop and/or a user-specified passenger destination), and a pickup time. The remote transportation system receives the ride request, processes the request, and dispatches a selected autonomous vehicles to pick up the passenger at the designated pickup location and at the appropriate time.

Figure 2:
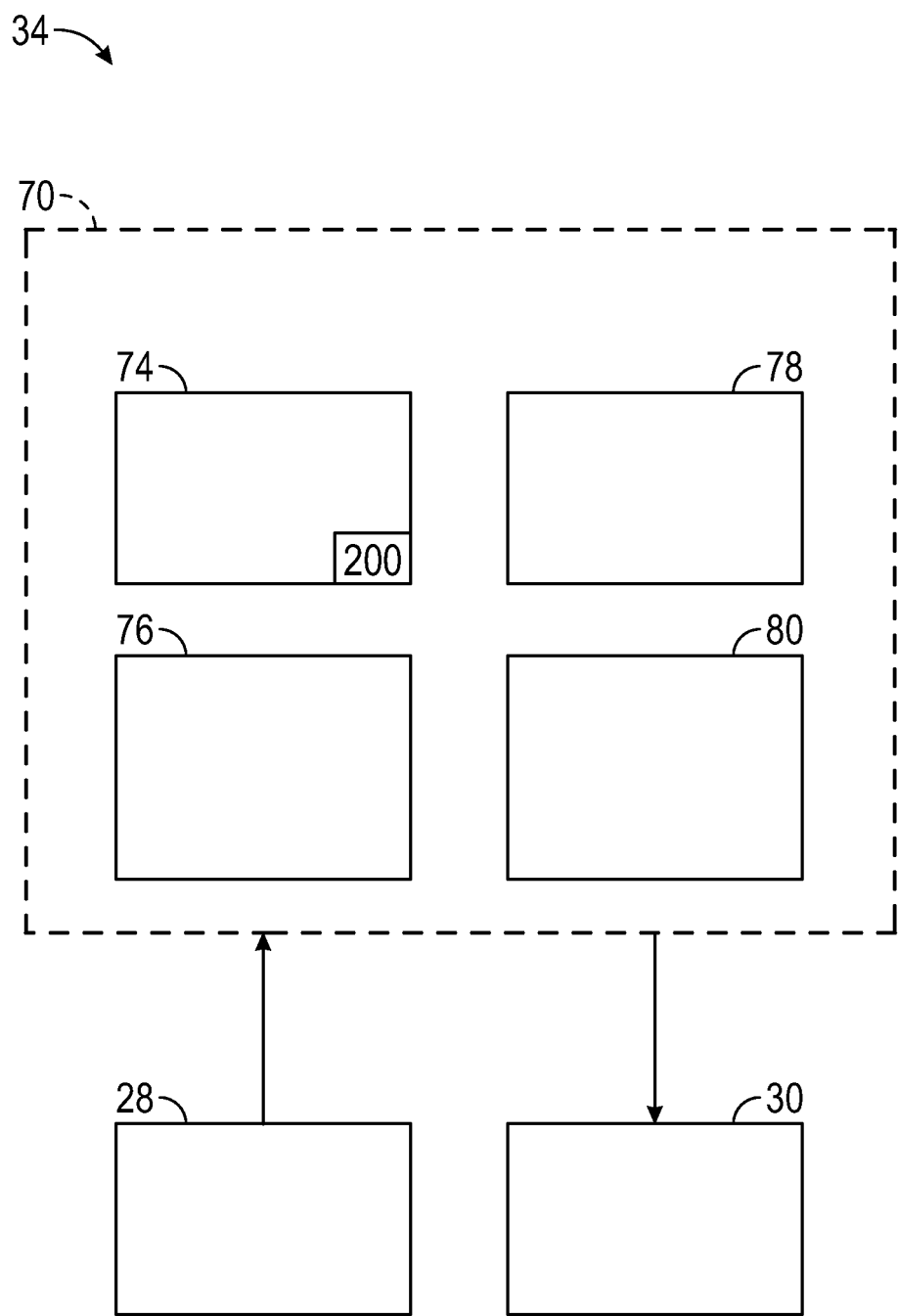
FIG. 2 illustrating an autonomous driving system that is associated with the communication system, in accordance with various embodiments.

Referring now to FIG. 2, and with continued reference to FIG. 1, In accordance with an exemplary autonomous driving application, the controller 34 implements an autonomous driving system (ADS) 70 as shown in FIG. 2. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The computer vision system 74 provides perception data that can be used by the communication system 200 to derive environmental contextual data useful for generating occupant messages describing the environment of the vehicle 10 to a user.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path. The position of the vehicle in the environment may also be useful for deriving environmental contextual data for generating occupant messages describing the environment of the vehicle 10 to a user. The control signals for controlling the vehicle 10 provide vehicle contextual data for generating occupant messages describing actions taken by the vehicle 10 to a user.

Environmental contextual data and vehicle contextual data can also be generated in vehicles equipped with ADAS systems using data from the sensor system 28 and ADAS vehicle control commands.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the communication system 200 of FIG. 1 is associated with the autonomous driving system 70 and may also be associated with further computer implemented devices and cloud processing systems.

The communication system 200 will now be described in greater detail with reference to FIGS. 3 and 4. The communication system 200 includes sources of vehicle and passenger context data including a driving control source 202, external cameras 204, internal cameras 206, a mapping module 208, a V2X module 210 and other environment data sources 212. Any suitable source of information that allows the communication system 200 to impute information on the environment internal and external to the vehicle and actions of the vehicle can be included. The driving control source 202 can be the vehicle control system 80 of FIG. 2, an ADAS control system or other source of vehicle controls or state that allows the communication system 200 to determine what actions have or will be taken by the vehicle 10 and to use that information to generate message to be conveyed to an occupant. The external cameras 204 (which can be included as part of the sensor system 28) can image the external scene around the vehicle to allow the environment of the vehicle 10 to be ascertained by the communication system 200. Other external perception systems can be included such as LiDAR, RADAR, ultrasound, etc. In some embodiments, a fusion of perception data from different sources can be used to generate data describing the vehicle environment, which, in turn, allows relevant messages describing the environment to be generated by the communication system 200. Further, the external cameras 204 or other perception sensor can allow a location of a passenger wishing to board the vehicle 10 to be determined. Internal cameras 206 allow imaging of occupants within a cabin of the vehicle 10 to be taken, which can be useful in deriving passenger information, particularly for automatically detecting whether a passenger is hearing of vision impaired. The mapping module 208 can be similar to the positioning system 76 described above or a more standard navigation tool. Generally, the mapping module will include detailed information on the environment of the vehicle 10 including names and types of places, which provide useful environment context data for generating descriptive messages to a user of the environment of the vehicle 10. The V2X module 210 allows information to be obtained from the environment including other vehicles, building devices, pedestrian devices, advertising devices, infrastructure, advisory devices, etc. Such information can be a rich source of environmental information for use in generating relevant messages to an occupant of the vehicle 10. Many other environment data sources 212 can be used in the communication system 200 to provide context data for use in generating messages for an occupant. In the embodiment of FIG. 3, the various types of data sources have been categorized as providing occupant context data 214 and vehicle context data 216. The occupant context data 214 includes passenger identification information or information relevant for identifying a passenger and the vehicle context data includes information describing actions taken by the vehicle 10 and external environmental information.

In the exemplary embodiment of FIG. 3, the communication system 200 includes an occupant message generation module 217 and an occupant output system 224. The occupant message generation module 217 receives the vehicle context data 216 and the occupant context data 214. The occupant message generation module 217 includes a vehicle context explanation sub-module 218 for generating messages describing actions and environmental context of the vehicle 10. The occupant message generation module 217 includes an occupant localization sub-module 222 and an occupant guidance sub-module 220 for locating an occupant inside or outside (a would-be occupant) the vehicle 10 and for providing movement directions to the occupant to safely take a seat, board the vehicle, disembark the vehicle, etc.

The vehicle context explanation sub-module 218 receives the vehicle context data 216 providing information on the outside environment and also providing information on actions taken by the vehicle 10. Information on the outside environment can include mapping information from the mapping module 208 such as location names, landmarks, shops, amenities, facilities, planned maneuvers, upcoming stops, traffic information, travel time remaining, etc., which may be of interest to a visually impaired person to provide context to their journey. The information can include information on any maneuvers that are noteworthy such as a sudden stop, a sudden turn or swerve, a lane change, a change of speed, etc. Such information is derived from the driving control source 202 and may be a filtered version of control commands when vehicle acceleration as indicated by, for example, an Inertial Measurement Unit, is beyond a certain threshold. Other information derived from the driving control source 202 can be vehicle state information such as fuel/battery level, use of horn, signals, etc. The vehicle context data 216 can include perception information such as that derived from external cameras 204. The perception information can be based on a labelled version of the outside environment as perceived by the sensor system 28 of the vehicle 10 after processing by one or more machine learning identification algorithms, which may be included in the computer vision system 74. Other environment data sources 212 can include a source of weather information, particularly when there is a change of weather that may favorably be explained to the passenger.

The vehicle context explanation sub-module 218 can resolve the vehicle context data 216 into messages. The vehicle context data 216 may provide information only for a limited upcoming time or distance window to ensure relevancy. Alternatively, the vehicle context explanation sub-module 218 may filter the received information to an upcoming time or distance limited window. For example, information that is related to an upcoming window of 200 feet (which may be a certain period of time based on current speed) may be processed. The vehicle context explanation sub-module 218 can algorithmically process the vehicle context data 216 into discrete messages that are embodied in message data 238, which is sent to the occupant output system 224. Exemplary messages can include: "entering [TOWN/CITY NAME]", "[BANK NAME] on the right", "sudden swerve to avoid vehicle ahead", "hail storm", "due to traffic, arrival time has been delayed by [X] minutes", "turning left", "changing lanes", "on freeway", "icy conditions", "stopping at traffic lights", "park area on the right", etc. Any information on the outside environment and actions taken by the vehicle that can be perceived, known or derived from the various data sources can be compacted into a relevant message and sent in message data 238 to the occupant output system 224.

In the exemplary embodiment, the occupant localization sub-module 222 is provided to locate a vision or hearing impaired passenger relative to the vehicle 10. The passenger may be located outside or inside of the vehicle 10. The occupant localization sub-module may receive an indication that a passenger (or would-be passenger) is hearing or vision impaired. This indication can be provided in the form of a notification from an application on an occupant device 240 or may be automatically determined as described with reference to FIG. 4. The indication can be provided as part of occupant context data 214. The occupant context data 214 can additionally include information enabling a location of the hearing or vision impaired person to be determined. This information may be a transmission signal from the occupant device 240 that allows triangulation (or other processing algorithm to locate a device based on received signal) by the signal receiver (and associated processing software) included in the connected system 36 of the vehicle 10. The transmission signal can be Bluetooth, ultrawideband, etc. Alternatively, once the passenger has been identified based on a signal from the occupant device 240, image processing may be performed to broadly locate the passenger within image data using real-word space to image space projection processing, which requires knowledge of camera intrinsic data. The image data can be provided by the external cameras 204 or the internal cameras 206 and included as part of the occupant context data 214. The broad or rough estimate of the passenger within the image data can then be refined using image processing to identify a passenger within the image. By performing a reverse process of image space to real-world space projection, refined coordinates for the location of the passenger can be obtained. The coordinate system may be in the frame of reference of the vehicle 10. Whichever specific algorithm is used to locate the passenger relative to the vehicle, three-dimensional (3D) coordinates for the passenger are generated by the occupant localization sub-module 222, which are sent to the occupant guidance sub-module 220. Other data modalities can be included to determine a position of the passenger such as processing of Lidar, Radar or other imaging modalities to locate the position of the passenger relative to the vehicle.

The occupant guidance sub-module 220 receives the 3D coordinates of the passenger location relative to the vehicle and has access to a vehicle model 242 including information on location of doors and location of seats. The occupant guidance sub-module 220 is thus able to generate detailed guidance messages using the precise 3D location of the passenger relative to the vehicle and the detailed vehicle model 242. The guidance messages can describe the actions to be taken to embark and disembark the vehicle 10. For example, the number of steps required, the direction of the steps, where to reach to find any vehicle features (e.g. a door handle, seat belt, etc.), etc. Further, the occupant localization sub-module 222 can track the location of the passenger in real-time so that the passenger movement guidance can be dynamically updated by the occupant guidance sub-module 220. The guidance messages can be embodied in message data 238 and output the to the occupant output system 224.

In the exemplary embodiment, the occupant output system 224 includes various output devices including a haptic device to provide haptic feedback to the occupant, an audio output device 244 (e.g. a speaker, headphones, earphones, etc.) for providing audio information to the occupant and a visual display device 228 for displaying information to the occupant. The various output devices can be included as part of the occupant device 240 or as part of the vehicle (e.g. vehicle speakers or vehicle displays). The occupant device 240 can be a laptop, tablet, smartphone or any other portable computer device. The occupant output system 224 includes a neural machine translation module 230, an output modality decision module 236, an assistance determination module 232 and a sign language animation generation module 234. The various module can be included in an application on the occupant device 240 or as part of the controller 34 of the vehicle 10.

The assistance determination module 232 is configured to determine whether an occupant requires special assistance for vision or hearing impaired persons and what type of assistance is required. The assistance determination module 232 may make such a determination based on an automatic detection process that is described with reference to FIG. 4 or based on information included in the occupant device 240 or based on information included in a database of occupant profile(s) 246. For example, the occupant device 240 may include a status notification that is communication to the occupant output system 224 either internally when the occupant output system 224 is part of the occupant device 240 or by wireless transmission when the occupant output system 224 is part of the vehicle 10. The status notification may be a setting of the occupant device 240 that is been selected by the passenger. In another example, the occupant device 240 may communicate an occupant identifier 248 to the occupant output system 224 included in the vehicle. The occupant output system 224 can retrieve a record corresponding to the occupant identifier 248 from the database of occupant profile(s) 246 to determine whether assistance is required and what type of assistance is required. In another example, the database of occupant profile(s) 246 may include biometric data identifying the passengers in each record. The occupant output system 224 may access the internal cameras 206 of the vehicle 10 or a camera of the occupant device 240 to obtain biometric data for each passenger in the vehicle to look up whether a record is included in the database of occupant profile(s) 246 indicating whether and what type of special assistance can be provided. The database of occupant profile(s) 246 can be stored on data storage of the vehicle 10 (e.g. the data storage device 32 described with respect to FIG. 1), on a storage device of the occupant device 240 or in cloud storage.

The assistance determination module 232 provides the information on type of assistance required to the output modality decision module 236, which sets the output modality to be provided to each passenger (if any). The output modality can be provided in different levels of sophistication. In one embodiment, the output modality is set as vision impaired or hearing impaired. In another embodiment, the output modality may include more detailed passenger preferences (obtained from the database of occupant profile(s) 246. For example, a hearing impaired person may prefer text messages rather than sign language messages. A vision impaired person may have a preference for large text rather than sound if their sight is not completely lost. In another example, the hearing or vision impaired preferences may choose from different levels of details in the messages. For example, a hearing impaired person may not want detailed information on the external scene and different vision impaired persons may prefer different levels of detail.

The neural machine translation module 230 may convert the messages included in the message data 238 into a preferred language of the occupant, which can be set in the database of occupant profile(s) 246. A default preferred language may be chosen by the occupant output system 224 depending on the language of the country in which the vehicle 10 was marketed.

The translated (if necessary) messages from the neural machine translation module 230 can be converted to speech (using text to speech processing) and provided to the audio output device 244 when the output modality is set for a vision impaired person. The translated messages can be provided to the sign language animation generation module 234 when the output modality is set for a hearing impaired person. As detailed above, the output messages may not be all of the messages included in the message data 238 as user preferences, and differing assistance requirements between hearing and vision impaired person, can result in a filtering of the messages provided so as to ensure relevancy.

The sign language animation generation module 234 receives the translated (if necessary) messages and produce an animated form of sign language to represent the entire message. The sign language used (e.g. American Sign Language, British Sign Language, Chinese Sign Languages, German Sign Language, etc.) may depend on the language of the message preferred according to the database of occupant profile(s) 246. The generated sign language animation is output on the visual display device 228 for the occupant.

It should be appreciated that the functionality of the vehicle context explanation sub-module 218 and the occupant guidance sub-module 220 do not necessarily both need to be provided. That is, both functionalities are independently useful. Thus, a system could be provided that either provides an explanation of vehicle actions and the external environment or provides movement guidance to a passenger in and around the vehicle 10. However, the combination of these functionalities provides enhanced utility for vision and hearing impaired persons.

With additional reference to FIG. 4, a detection system 300 for automatically detecting if any occupant of the vehicle 10 is vision or hearing impaired in accordance with an embodiment. The detection system 300 includes an occupant monitoring system 302 including a camera 304, a sound generator 306, an occupant identification module 308 and an image analysis module. The camera 304 may be one of the internal cameras 206 of FIG. 3. The camera 304 provides frames of image data (i.e. video data) for each occupant to the image analysis module 310 for analysis to determine if the occupant has hearing or vision impairment.

The occupant identification module 308 determines whether occupants of the vehicle 10 are already known to the communication system 200. In particular, the occupant identification module 308 may receive the occupant identifier 248 from the occupant device 240, which can be used to look up the database of occupant profile(s) 246 to see if a record already exists. Alternatively, the occupant identification module 308 can receive image data taken by the camera 304 of the occupant and perform facial, or other biometric, recognition processing thereon. The biometric data can then be compared with biometric data included in the database of occupant profile(s) to see if the occupant is already known to the communication system 200. If a record already exists, the output modality of the occupant can be ascertained without automatic detection and the process proceeds to outputting messages according to the stored output modality as described with respect to FIG. 3. If a record does not exist, the process passes to analyzing the image data from the camera 304 to automatically detect vision or hearing impairment.

The image analysis module receives frames of image data from the camera 304 and can perform a variety of algorithmic processes to determine if the occupant is vision or hearing impaired. In one process, eye movements are extracted from the image data, which can be indicative of vision impaired persons. In another process, the sound generator 306 provides a sound and the image data is analyzed to gauge any reaction to the sound. In one example, the sound is directional (e.g. from one side of a stereo speaker system of the vehicle 10) and the analysis detects head movement toward the sound. The detection based on sounds can indicate hearing impaired persons. In another example, a vehicle light can be activated in the vehicle 10. For example, flashing lights can be used. The image data can be analyzed to gauge any reaction to the light, which can be indicative of whether a person is vision impaired. In another example, the image analysis module 310 can detect vision impaired persons by analyzing how the occupant moves around the cabin, which will likely be different from non-vision impaired persons. A combination of such techniques can also be used. In one embodiment, a machine learning algorithm is included in the image analysis module 310, which is trained based on a stock of labelled (e.g. hearing impaired, vision impaired, non-hearing impaired, non-vision impaired) input image data. Although the present embodiment has been described in the context of image analysis, other perception modalities could be applicable. For example, lidar data could be provided additionally, or alternatively, to the image data, which could be monitored (processed) for characteristic movements of vision impaired persons or for a movements responsive to a generated sound for hearing impaired persons.

The detection of vision or hearing impaired persons by the image analysis module 310 can be sent to the occupant output system 224 so that messages are provided to the occupant according to the appropriate output modality. Further, the detection result can be saved in the database of occupant profile(s) along with an occupant identifier 248 or biometric data extracted from image data taken by the camera 304.

It may be appreciated that the detection system 300 of FIG. 4 is more broadly applicable than the communication system 200 of FIG. 3. That is, the automatic detection system 300 of FIG. 4 has utility in a variety of applications where automatic detection of hearing or vision impaired persons would be desirable. The output modality can be set based on the automatic detection although the content of the output can be of a variety of kinds that are not necessarily limited to the messages generated by the communication system 200 of FIG. 3.

In embodiments of the present disclosure, the communication system 200 stores a user's preferred modality for communication (including audio/sign language animations and language preference) in the database of occupant profile(s) 246. The communication system 200 translates and converts any notifications from the vehicle 10 into the user's preferred communication mode. The communication system 200 uses wireless communication to precisely determine a location of a user relative to the vehicle 10. The communication system 200 offers the user guidance for approaching, entering, exiting, and departing the vehicle 10 based on wireless communication and/or perception information. Accordingly, the communication system 200 is able to leverage a user's saved mode of communication to provide information from the vehicle 10 to the user in a personalized manner. The communication system 200 is also able to leverage connectivity and perception technologies to provide precise positioning information.

In additional or alternative embodiments of the present disclosure, the communication system 200 combines environment information and vehicle action information to create a contextual explanation of actions for output. The communication system 200 uses neural machine translation to generate audio in a chosen auditory language, uses neural machine translation to generate sign language in a chosen sign language, and then generates sign language animations (and/or text output), and finally outputs the generated audio and sign language animations. Accordingly, the present disclosure enables hearing and vision impaired occupants to understand the actions taken by an automated driver-assistance system (ADAS) or a more fully autonomous vehicle by combining relevant environment details with an explanation of the actions of the vehicle 10 and provides this information in modalities aimed at hearing and vision impaired individuals.

In additional or alternative embodiments of the present disclosure, the communication system 200 identifies the appropriate communication modality with an individual by identifying irregular eye movements, monitoring a reaction to a generated tone and stores the modality for later retrieval. Accordingly, a hearing or vision impaired person may be identified without previous interaction with an individual to initiate communication through an alternate modality appropriate for that person.

Referring now to FIGS. 5 and 6, and with continued reference to FIGS. 1-4, flowcharts illustrate methods 500, 600 that can be performed by the communication system 200 described with respect to FIGS. 1 to 4 in accordance with the present disclosure. As can be appreciated in light of the disclosure, the order of operation within the method is not limited to the sequential execution as illustrated in FIGS. 5 and 6, but may be performed in one or more varying orders as applicable and in accordance with the present disclosure. In various embodiments, the methods 500, 600 can be scheduled to run based on one or more predetermined events, and/or can run continuously during operation of the vehicle 10. Exemplary predetermined events can be at each stop to pick up a passenger, at each start of the vehicle 10, each approach to the vehicle by a new occupant (would-be occupant) or each opening of a door of the vehicle 10.

FIG. 5 illustrates a method of communicating with a vision or hearing impaired person according to a preferred output modality. In step 502, vehicle and/or occupant context data 214, 216 is received from the various data sources of the communication system 200. The vehicle context data 216 can include environment information concerning the scene outside the vehicle 10 and information (e.g. derived from automatic driving commands) on actions taken by the vehicle 10. The occupant context data 214 can particularly relate to information enabling a precise 3D location of the would-be occupant to be determined.

In step 504, message data 238 is generated. The message data 238 can include explanations of vehicle actions and/or the outside environment based on the vehicle context data 216. The message data 238 can also, or alternatively, include movement guidance based on the occupant context data 214 to assist a hearing or vision impaired person in boarding the vehicle, finding a seat, buckling a seat belt and/or disembarking the vehicle 10.

In step 506, a determination is made whether an occupant is hearing or vision impaired. This can be performed by looking-up the database of occupant profile(s) 246 or by automatic detection as will be described with respect to FIG. 6. Depending on whether the occupant is hearing or vision impaired, an appropriate output modality is set. In some embodiments, the occupant may also have saved in their preferences stores in the database of occupant profile(s) a language of the messages and a preferred standard of sign language.

In step 508, an output for the occupant is generated according to the set output modality and the preferred language of the message and standard of sign language (e.g. American Sign Language). The neural machine translation module 230 can translate the messages into the preferred language. In the case of hearing impaired persons, the sign language animation generation module 234 can convert the messages into animated sign language of the desired type and output through the visual display device 228. In the case of vision impaired persons, the translated messages can be converted into speech and output through the audio output device 244.

Referring to FIG. 6, an exemplary method 600 of automatically detecting vision and hearing impaired occupants in the vehicle 10. In step 602, frames of image date (e.g. video data) is received from the camera 304. In step 604, the image data is analyzed to determine whether the occupant of the vehicle 10 is hearing or vision impaired. In one embodiment, the analysis includes processing by a machine learning algorithm that has been trained to detect vision impaired and hearing impaired occupants. The analysis may include detecting irregular eye movements, which can be indicative of a vision impaired person. The analysis may include irregular movement internal to a cabin of the vehicle, which can be indicative of a vision impaired person. The analysis may include detecting an irregular, or absence of, a response to a sound generated by the audio output device 244, which can be indicative of a hearing impaired person. Whether the occupant is hearing or vision impaired will instruct an appropriate output modality. In step 606, messages, notification, advisories, etc. are output according to the set output modality. When the occupant is vision impaired, the output of step 606 can be via speech to text processing and audio is output through the audio output device 244. When the occupant is hearing impaired, the output of step 606 can be via display of sign language animation (and/or text output) on the visual display device 228.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system associated with a vehicle, comprising:
an occupant output system comprising at least one output device;
at least one source of vehicle context data; and
at least one processor in operable communication with the occupant output system and the at least one source of vehicle context data, wherein the at least one processor is configured to execute program instructions, wherein the program instructions are configured to cause the at least one processor to:
receive vehicle context data from the at least one source of vehicle context data;
determine if an occupant associated with the occupant output system is at least one of vision and hearing impaired;
generate occupant message data based on the vehicle context data;
when the occupant is determined to be at least one of vision and hearing impaired, decide on an output modality to assist the occupant, wherein the output modality is at least one of sign language animation and text data on a visual display device of the at least one output device when the occupant is determined to be hearing impaired and wherein the output modality is an audio output on an audio output device of the at least one output device when the occupant is determined to be vision impaired; and
generate an output for the occupant on the at least one output device based on the decided output modality and based on the occupant message data,
wherein:
the vehicle context data includes occupant location relative to the vehicle and an occupant identifier;
the occupant location and the occupant identifier is determined based on at least one of: wireless communications from an occupant device and processing of perception data;
the occupant message data includes guidance on at least one of approaching, entering, exiting, and departing the vehicle, which is determined based on the occupant location; and
determining if an occupant associated with the occupant output system is at least one of vision and hearing impaired is based on the occupant identifier.

2. The system of claim 1, wherein the vehicle context data includes image or other perception data from an external scene of the vehicle.

3. The system of claim 1, wherein the at least one processor is configured to: receive occupant context data and generate the occupant message data based on the occupant context data, wherein the occupant context data includes a location of the occupant relative to the vehicle.

4. The system of claim 3, wherein the program instructions are configured to cause the at least one processor to determine the location of the occupant relative to the vehicle based on at least one of:
one or more transmission signals from an occupant device; and
processing of perception data.

5. The system of claim 1, wherein the vehicle context data includes vehicle behavior information based on vehicle control commands.

6. The system of claim 1, wherein the vehicle context data includes map data.

7. The system of claim 1, wherein the occupant message data includes a message describing an environment external to the vehicle.

8. The system of claim 1, wherein the occupant message data includes guidance for the occupant for embarking or disembarking the vehicle or any other occupant actions associated with the vehicle.

9. The system of claim 1, wherein the occupant message data includes a description of actions taken by the vehicle.

10. The system of claim 1, wherein determining whether the occupant is at least one of vision and hearing impaired is based on stored occupant data.

11. The system of claim 10, wherein determining whether the occupant is at least one of vision and hearing impaired includes retrieving the stored occupant data based on an occupant identifier.

12. The system of claim 11, wherein the occupant identifier is determined based on biometric identification of the occupant or based on a communication from an occupant device.

13. The system of claim 1, wherein determining whether the occupant is at least one of vision and hearing impaired is performed by automatic detection.

14. The system of claim 1, wherein generating the output for the occupant includes translating a message included in the occupant message data into a preferred language of the occupant.

15. The system of claim 1, wherein generating the output for the occupant includes generating the at least one of sign language animation and text data and displaying the at least one of the sign language animation and text data on the visual display device of the at least one output device when the occupant is determined to be hearing impaired.

16. The system of claim 1, wherein generating the output for the occupant includes generating the audio output on the audio output device of the occupant output system when the occupant is determined to be vision impaired.

17. The system of claim 1, wherein the vehicle context data is generated by the at least one processor by fusing environmental data from a perception system and vehicle action data derived from vehicle control commands generated by an autonomous driving system of the vehicle.

18. A method for controlling an occupant output system associated with a vehicle, the method comprising:
receiving, via at least one processor, vehicle context data from at least one source of vehicle context data;
determining, via the at least one processor, if an occupant associated with the occupant output system is at least one of vision and hearing impaired;
generating, via the at least one processor, occupant message data based on the vehicle context data;
when the occupant is determined to be at least one of vision and hearing impaired, deciding, via the at least one processor, on an output modality to assist the occupant, wherein the output modality is at least one of sign language animation and text data on a visual display device of the at least one output device when the occupant is determined to be hearing impaired and wherein the output modality is an audio output on an audio output device of the at least one output device when the occupant is determined to be vision impaired; and
generating, via the at least one processor, an output for the occupant on at least one output device of the occupant output system based on the output modality and based on the occupant message data
wherein:
the vehicle context data includes occupant location relative to the vehicle and an occupant identifier;
the occupant location and the occupant identifier is determined based on at least one of: wireless communications from an occupant device and processing of perception data;
the occupant message data includes guidance on at least one of approaching, entering, exiting, and departing the vehicle, which is determined based on the occupant location; and
determining if an occupant associated with the occupant output system is at least one of vision and hearing impaired is based on the occupant identifier.

19. The method of claim 18, comprising generating, via the at least one processor, the at least one of sign language animations and text data as the output for the occupant when the occupant is determined to be hearing impaired.

* * * * *